Figure 1:
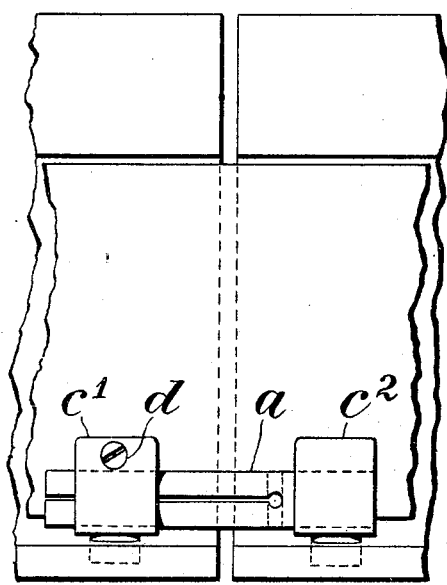

No. 683,045. Patented Sept. 24, 1901.
C. HOLZMANN.
ELECTRIC COUPLING FOR CONDUCTORS.
(Application filed Mar. 5, 1901.)
(No Model.)

Witnesses:
L. Staaden
S. Staaden

Inventor;
Charles Holzmann
by Alfred Müller,
Attorney.

THE NORRIS PETERS CO., PHOTO-LITHO., WASHINGTON, D. C.

UNITED STATES PATENT OFFICE.

CHARLES HOLZMANN, OF BUDAPEST, AUSTRIA-HUNGARY.

ELECTRIC COUPLING FOR CONDUCTORS.

SPECIFICATION forming part of Letters Patent No. 683,045, dated September 24, 1901.

Application filed March 5, 1901. Serial No. 50,000. (No model.)

*To all whom it may concern:*

Be it known that I, CHARLES HOLZMANN, a citizen of Austria-Hungary, residing at Budapest, Austria-Hungary, have invented a certain new and useful Improved Electric Coupling for Conductors, of which the following is a specification, reference being had therein to the accompanying drawings.

Electric overhead railways naturally use the track as return-conductor. As, however, the ordinary fish-plate coupling is not sufficient as regards its electric conductivity, the separate rails are connected together by means of special conductors. The efficiency of these conductive couplings determines the efficiency of the rail-track as regards its electric conductivity. Lower efficiency causes loss of power and is a main cause of stray currents, which, as is well known, interfere with the telephone-circuits and also, owing to their electrolytic action, injure the underground pipe systems. The manner in which the rails are conductively connected is therefore of the greatest importance. The conductive connecting of the single rails is now usually effected by pieces of wire or wire cable, the ends of which on both sides are attached to the rail-feet close to the fish-plate joint and, so to speak, "bridge" over the latter. As the length of this piece of wire or wire cable, having regard to the expansion of the rail caused by heat and to the fish-plate joint, cannot be less than about five hundred millimeters and as its diameter, in order to preserve sufficient elasticity, also cannot be increased at will, the rail-couplings thus made present a considerable resistance. Their greatest defect, however, is that they can so easily be injured, on the one hand, in repairing the track and, on the other hand, owing to their value and their accessibility, they are frequently intentionally destroyed and stolen.

The object of the present invention is a conducting-rail coupling which by means of the short length and conductibility (which can be increased at will) thereof and by means of its arrangement which prevents it being damaged or stolen fulfils all legitimate requirements both as regards its efficiency and suitability and also having regard to the purposes set forth above.

In this coupling the object aimed at is attained by employing a sliding contact which in spite of the alteration in the length of the rails constantly maintains a conductive contact between the adjacent rails and, so to speak, merely "bridges" the expansion-space.

In the accompanying drawings a few constructional forms of this rail-coupling are shown for example.

Figure 2:
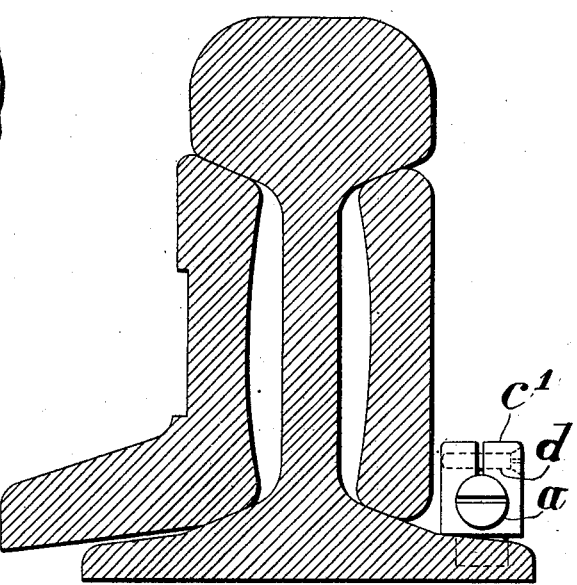
Figure 3:
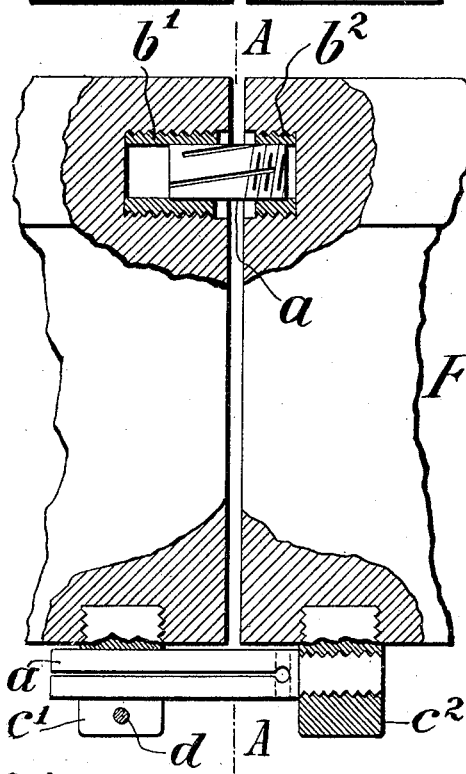
Figure 4:
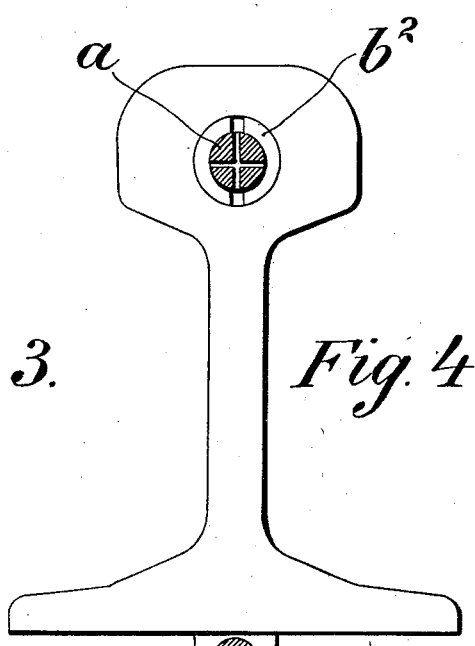

Figure 1 shows a side elevation of a part of the rails to be connected and of the electric coupling. Fig. 2 is a cross-section of the rail and a face elevation of the coupling. Fig. 3 shows another constructional form and arrangement of the electric coupling. Fig. 4 is a section on the line A A of Fig. 3.

The sliding contact consists of a cylindrical metal pin (plug) slit longitudinally in order to give it sufficient elasticity, one end of which is firmly and conductively connected with one of the rails, the other end being inserted into a socket firmly attached to the second rail. When the interval between the rails alters, the plug is moved more or less in or out of this socket. The aforesaid rail-coupling with sliding contact can be constructed and arranged in various ways. As regards its arrangement it may be employed in two essentially-different forms. In the first form of construction the spring contact-piece $a$ is inserted in the end faces, preferably in the heads of the adjacent rails. For this purpose suitable holes are made in the rail-heads, in each of which is fixed a metal socket $b'$ $b^2$ in such a manner that it forms as good metallic contact as possible with the rail. For this object these sockets are preferably made of phosphor-bronze, slotted longitudinally, and firmly screwed into the screw-matrix made in the rail-head. One socket $b'$ is long enough to inclose the contact-piece $a$, the length of which is about ten millimeters more than the expansion-gap, into its smooth bore. The other socket $b^2$ is provided with screw-threadings and is somewhat shorter than the first socket $b'$. When the ends of the rails have been mechanically joined by means of the fish-plates, the contact-piece $a$, which has previously been put into the long socket $b'$, is drawn out by aid of a suitable tool and the free end screwed into the socket $b'$. The slots in the plug, which give it spring, enable this operation to be carried out, or special groovings may be made for this purpose. The efficiency of the good conductive rail-coupling constructed in this manner is only heightened by the pressure of the wheels, as thereby the metallic contact of the component parts is made more perfect. It is also evident that this rail-coupling cannot easily be damaged either in repairing the track or intentionally and that, moreover, it remains always controllable.

Whereas the construction described above is chiefly intended to be used when there are only small expansion-gaps between the rails—for instance, with rails which are laid alongside street-pavement—the other modifications of the rail-coupling with sliding contact illustrated in two modifications in the accompanying drawings should be employed when a track is to be conductively connected the rail-wires of which are not covered by the pavement, and therefore in which there may be a wider expansion-gap. In this case, as will be seen from the drawings, a contact-block $c'c^2$ is firmly and conductively fixed in each of the rail ends either underneath, Figs. 3 and 4, or, if the fish-plate joint will allow of it, above, Figs. 1 and 2, but in both cases as near as possible to the ends of the rails. It is preferable to screw the block into the rail after a little quicksilver has been poured into the matrix made in the rail-foot, which then makes close contact between the contact-blocks and the rail. Both the contact-blocks $c'$ and $c^2$ are perforated and are thus adapted for receiving the contact-plug $a$, which, as in the previous example, is fixed, or possibly screwed, into the one contact-block $c^2$, but is simply inserted into the other, with which it comes well into contact owing to its elastic formation. In order that the sliding contact may be as complete as possible, the contact-block $c'$ is slotted, and the two portions of the said block can be pressed on the piece $a$, if desired, by aid of a thumb-screw $d$. The rail-coupling with sliding contact can of course not only be employed for the electric connection of rails, but also for connecting the current-conductors used in electric railways with the channel system and also generally where there are expansion-gaps between rigid current-conducting parts to be conductively bridged over.

What I claim as new is—

1. An electric bond for separated conductors consisting of a plug spanning the gap between the rails, means for securing the plug to the adjacent rails constructed to permit relative movement of the plug and connections, and said plug being longitudinally slitted, substantially as described.

2. An electric bond for separated conductors consisting of a plug spanning the gap between the rails, means for securing one end of said plug to one of the conductors, and means for slidably securing the opposite end of the plug to the other adjacent conductor; said plug being longitudinally slitted, substantially as and for the purpose set forth.

3. An electric bond for separated conductors consisting of a plug spanning the gap between the rails, one of said rails being provided with a socket to which one end of the plug is attached and the other adjacent rail being provided with a socket in which the plug is slidably mounted, substantially as described.

4. An electric bond for separated conductors consisting of a plug spanning the gap between the rails, a socket attached to one conductor to which one end of the plug is rigidly secured, a split socket located on the adjacent end of the second conductor and in which the free end of the plug is slidably mounted, and means for compressing the split socket, substantially as described.

In testimony whereof I affix my signature in presence of two witnesses.

CHARLES HOLZMANN.

Witnesses:
SCHÖN FÜLÖP,
FRANK DYER CHESTER.